US012771644B2

(12) United States Patent
Ma et al.

(10) Patent No.: US 12,771,644 B2
(45) Date of Patent: Oct. 20, 2026

(54) FRAME COLLISION RATE CALCULATION METHOD FOR FRAME ON CAN BUS, AND CAN BUS RESOURCE MINIMIZATION METHOD

(71) Applicant: SHENZHEN POWEROAK NEWENER CO., LTD, Shenzhen (CN)

(72) Inventors: Hui Ma, Shenzhen (CN); Jianhua Lei, Shenzhen (CN); Zhihua Guo, Shenzhen (CN); Fan Li, Shenzhen (CN); Geng Qin, Shenzhen (CN); Haiyang Li, Shenzhen (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 41 days.

(21) Appl. No.: 18/956,970

(22) Filed: Nov. 22, 2024

(65) Prior Publication Data

US 2025/0088465 A1 Mar. 13, 2025

Related U.S. Application Data

(63) Continuation of application No. PCT/CN2023/095374, filed on May 19, 2023.

(30) Foreign Application Priority Data

May 24, 2022 (CN) ......................... 202210567859.5

(51) Int. Cl.

*H04L 47/10* (2022.01)
*H04L 12/40* (2006.01)
*H04L 47/24* (2022.01)

(52) U.S. Cl.

CPC ........ *H04L 47/16* (2013.01); *H04L 12/40065* (2013.01); *H04L 47/24* (2013.01); *H04L 2012/40215* (2013.01)

(58) Field of Classification Search

CPC ... H04L 47/16; H04L 12/40065; H04L 47/24; H04L 2012/40215; H04L 12/40169;
(Continued)

(56) References Cited

U.S. PATENT DOCUMENTS

2004/0068556 A1* 4/2004 Radpour ............. H04L 41/0896 709/223
2008/0049649 A1* 2/2008 Kozisek ................ H04W 48/20 370/310

(Continued)

FOREIGN PATENT DOCUMENTS

CN 1326645 A 12/2001
CN 103327511 A 9/2013

(Continued)

*Primary Examiner* — Javier O Guzman
(74) *Attorney, Agent, or Firm* — Scully, Scott, Murphy & Presser, P.C.

(57) ABSTRACT

A frame collision rate calculation method for a frame on a CAN bus, and a CAN bus resource minimization method are provided. The CAN bus resource minimization method includes: S1, setting an initial CAN bus communication rate; S2, according to the preset rate in step S1 and an Erlang B formula in the queuing theory, calculating a frame collision rate of each priority; S3, determining whether the frame collision rate of each priority calculated in step S2 exceeds an allowable frame collision rate upper limit; if so, increasing the CAN bus communication rate, and returning to step S2; and if not, decreasing the CAN bus communication rate, and returning to step S2; and S4, outputting a minimum communication rate corresponding to the frame collision rate of a frame of each priority that does not exceed the allowable frame collision rate upper limit.

14 Claims, 3 Drawing Sheets

(58) Field of Classification Search
CPC ............... H04L 12/413; H04L 12/4135; H04L 12/40143; H04L 41/0823; H04L 43/0823
See application file for complete search history.

(56) References Cited

U.S. PATENT DOCUMENTS

| | | | | |
|---|---|---|---|---|
| 2008/0159131 | A1 | 7/2008 | Hoeflin et al. | |
| 2008/0225842 | A1* | 9/2008 | Goldfein | H04L 1/1825 370/389 |
| 2019/0253961 | A1* | 8/2019 | Bouvet | H04W 48/18 |

FOREIGN PATENT DOCUMENTS

| | | | | |
|---|---|---|---|---|
| CN | 103823780 | A | 5/2014 | |
| CN | 105205536 | A | 12/2015 | |
| CN | 107645455 | A | 1/2018 | |
| CN | 114650195 | B | 7/2022 | |
| EP | 2219413 | A1 * | 8/2010 | H04W 24/10 |

* cited by examiner

FRAME COLLISION RATE CALCULATION METHOD FOR FRAME ON CAN BUS, AND CAN BUS RESOURCE MINIMIZATION METHOD

TECHNICAL FIELD

The present invention relates to the technical field of data transmission, and in particular, relates to a frame collision rate calculation method for a frame on a CAN bus and a CAN bus resource minimization method.

BACKGROUND

In the automobile industry, various electronic control systems have been developed because of the requirements for safety, comfort, convenience, low power consumption, and low cost. Due to the different data types used for communication and different reliability requirements among these systems, there are many cases where multiple buses are involved, which correspondingly increases the number of wire harnesses. In order to meet the needs of "reducing the number of wire harnesses" and "carrying out high-speed communication of large amounts of data through multiple LANs", an automobile-oriented CAN communication protocol was developed in 1986 by the German electrical manufacturer Bosch Company.

CAN, the full name of which is Controller Area Network, is a data protocol bus proposed by Bosch Company of German in 1985. It is currently widely used in distributed real-time control fields such as automotive electronics and industrial automation. As compared to general communication buses, CAN bus data communication features outstanding reliability, real-time performance and flexibility. The CAN bus has attracted more and more attention because of its good performance and unique design. It is most widely used in the automotive field, and some well-known automobile manufacturers in the world have adopted the CAN bus to realize data communication between the internal control system and various detective and executive mechanisms in the automobiles. At the same time, due to the characteristics of the CAN bus itself, it has been applied to the fields of automatic control, aerospace, navigation, process industry, machinery industry, textile machinery, agricultural machinery, robots, computer numerical control machine tools, medical apparatuses and instruments, sensors or the like, instead of being limited to the automobile industry, and thus it is known as the computer local area network in the field of automation. The emergence of CAN has provided strong technical support for distributed control systems to realize real-time and reliable data communication among various nodes. CAN has formed an international standard and has been recognized as one of the most promising field buses.

The data segment of the frame for the CAN bus allows at most 8 bytes and uses a short frame structure, and thus the transmission time is short and the probability of being interfered with is low. However, as the load rate of the bus increases, frame collisions on the bus are inevitable. In order to enhance reliability, during the development of product protocols by using the CAN bus, usually frames are sent periodically or a random waiting time is added to the frame to be sent to prevent the occurrence of frame collision events, but this undoubtedly reduces the communication efficiency and causes a waste of communication resources.

It shall be noted that, the information disclosed in the above background section is only used for understanding the background of the present application, and therefore may include information that does not constitute prior art known to those of ordinary skill in the art.

SUMMARY

A frame collision rate calculation method for a frame on a CAN bus includes calculating the frame collision rate of the frame, based on an Erlang B formula in the queuing theory according to an CAN bus communication rate, a sending frequency and a frame length of the frame.

In some embodiments, frames on the CAN bus include multiple priorities, and the frame collision rate of the frame of each priority is calculated in the descending order of the priorities, wherein the frame collision rate of the frame of the highest priority is calculated directly using the Erlang B formula; while the frame collision rate of the frame of each of the remaining priorities is calculated using the Erlang B formula in combination with the cumulative traffic load and overflow traffic load of the priority.

In some embodiments, the frame collision rate Bp[i] of the frame of each priority is calculated as follows:

$$Bp[i] = \begin{cases} ErlangB(A[i], k) = \dfrac{A[i]}{1 + A[i]}, & i = 0 \\ \dfrac{ErlangB(\text{L\_S}[i], k) \times \text{L\_S}[i] - \text{A\_L}[i])}{A[i]}, & i = 1, 2, \cdots, p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, L_S[i] represents the accumulated traffic load of the priority i, and A_L[i] represents the overflow traffic load from a higher priority to the priority i.

In some embodiments, the traffic load A[i] of the priority i relative to the CAN bus, the accumulated traffic load L_S[i] of the priority i, and the overflow traffic load A_L[i] from a higher priority to the priority i are calculated respectively as follows:

$$A[i] = \frac{L[i] \times S[i]}{B};$$

$$\text{L\_S}[i] = \sum\nolimits_0^i A[j];$$

$$j = 0, 1, \cdots, i;$$

$$\text{A\_L}[i] = \sum\nolimits_0^{i-1} (Bp[m] \times A[m]);$$

$$m = 0, 1, \cdots, i-1;$$

wherein L[i] and S[i] respectively represent the sending frequency and the frame length of the frame of the priority i, and B represents the current CAN bus communication rate.

A CAN bus resource minimization method comprises the following steps:

S1. setting an initial CAN bus communication rate;

S2. at the CAN bus communication rate in step S1 and on the basis of an Erlang B formula in the queuing theory, calculating a frame collision rate of a frame of each priority, the running of which on a CAN bus is planned;

S3. determining whether the frame collision rate of the frame of each priority calculated in step S2 exceeds an allowable frame collision rate upper limit associated with the respective priority; when the frame collision rate calculated in step S2 exceed the allowable frame collision rate upper limit, increasing the CAN bus communication rate in step S1, and returning to step S2 for continued iteration;

when the frame collision rate calculated in step S2 does not exceed the allowable frame collision rate upper limit, decreasing the CAN bus communication rate in step S1, and returning to step S2 for continued iteration; and

S4. outputting a minimum communication rate corresponding to not exceeding the allowable frame collision rate upper limit associated with the respective priority.

In some embodiments, in the step S1, a fixed value is given as the initial CAN bus communication rate.

In some embodiments, in the step S1, the initial CAN bus communication rate is calculated by the following formula:

$$\mathrm{B\_x} = L[0] \times S[0] \times \frac{1 - \mathrm{Bp\_T}[0]}{\mathrm{Bp\_T}[0]};$$

wherein B_x is the initial CAN bus communication rate, L[0], S[0], and Bp_T[0] respectively represent the sending frequency, the frame length, and the allowable frame collision rate upper limit of the frame of the highest priority.

In some embodiments, the step S2 includes: at the CAN bus communication rate in step S1 and on the basis of an Erlang B formula in the queuing theory, calculating the frame collision rate of the frame of each priority in the descending order of priorities, wherein the frame collision rate of the frame of the highest priority is calculated directly using the Erlang B formula, while the frame collision rate of the frame of each of the remaining priorities is calculated using the Erlang B formula in combination with the cumulative traffic load and overflow traffic load associated with the respective priority.

In some embodiments, the frame collision rate Bp[i] of the frame of each priority is calculated as follows:

$$Bp[i] = \begin{cases} ErlangB(A[i], k) = \dfrac{A[i]}{1 + A[i]}, & i = 0 \\ \dfrac{ErlangB(\mathrm{L\_S}[i], k) \times \mathrm{L\_S}[i] - \mathrm{A\_L}[i])}{A[i]}, & i = 1, 2, \cdots, p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, L_S[i] represents the accumulated traffic load of the priority i, and A_L[i] represents the overflow traffic load from a higher priority to the priority i.

In some embodiments, A[i] is calculated as follows:

$$A[i] = \frac{L[i] \times S[i]}{B};$$

wherein L[i] and S[i] respectively represent the sending frequency and the frame length of the frame of the priority i, and B represents the current CAN bus communication rate.

In some embodiments, L_S[i] is calculated as follows:

$$\mathrm{L\_S}[i] = \sum\nolimits_0^i A[j];\ j = 0, 1, \ldots, i.$$

In some embodiments, A_L[i] is calculated as follows:

$$A_{L[i]} = \sum\nolimits_0^{i-1} (Bp[m] \times A[m]);$$
$$m = 0, 1, \cdots, i-1.$$

In some embodiments, the increasing or decreasing of the CAN bus communication rate in the step S3 is performed by a stepwise method and/or a binary search method.

The present invention further provides a computer-readable storage medium with a computer program stored thereon, and the computer program, when executed by a processor, can implement the CAN bus resource minimization method described above.

DETAILED DESCRIPTION

Figure 1:
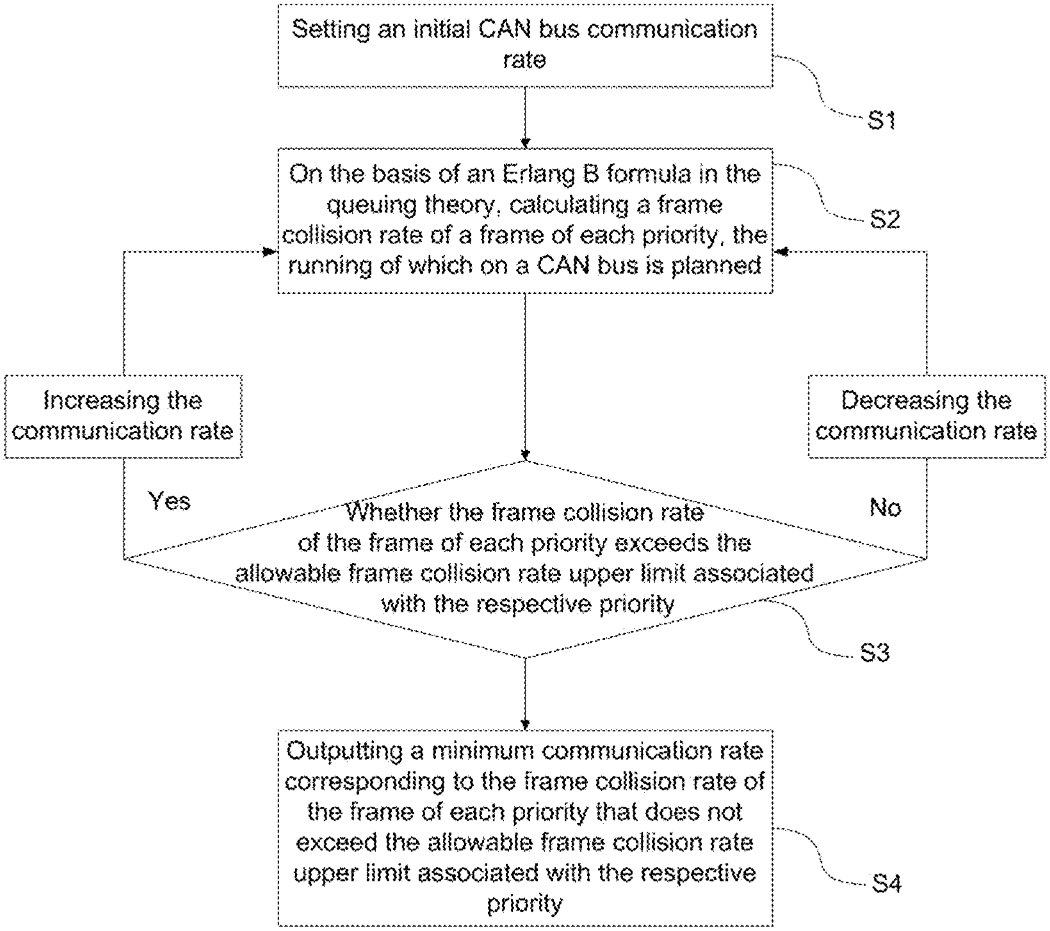
FIG. 1 is a flowchart diagram of a CAN bus resource minimization method according to an embodiment of the present invention.

The embodiments of the present invention will be described in detail below. It shall be emphasized that the following description is exemplary only and is not intended to limit the scope and application of the present invention.

The terms "first" and "second" are used for descriptive purposes only and should not be construed as indicating or implying relative importance or implicitly indicating the quantity of the indicated technical features. Therefore, features defined by "first" and "second" may explicitly or implicitly include one or more said features. In the description of the embodiments of the present invention, "multiple" means two or more, unless explicitly and specifically defined otherwise.

When designing and developing products using the CAN bus, the configuration of the CAN bus resources must be planned first. Currently, designers mostly refer to empirical values accumulated in the past. For example, in order to reduce the probability of frame collision events on the bus, the load rate of the CAN bus is generally set below 30%. The load rate can be calculated simply by the number of nodes connected to the bus, the sending frequency of each node and the frame length. A priority mechanism is introduced into the CAN bus, in which each priority competes for the transmission resources of the bus through a non-destructive arbitration mechanism. The CAN bus protocol currently may support at most 8 priorities. The protocol defines that the lower the value of the flag bit of a bit is, the higher the priority of the bit will be. That is, 0x00 has the highest priority, while 0x07 has the lowest priority. If data transmission to the bus is performed simultaneously by high and low priorities, then the frame of the high priority automatically obtains the transmission resources, while the frame of the low priority withdraws from arbitration. The frame of the low priority performs retransmission when the bus resources are idle according to the automatic retransmission mechanism. As a result, a frame collision event occurs for the frame of the low priority. In specific operation scenarios, designers may pay particular attention to the frame collision rate of the frame of a certain priority. However, the frame collision rates of frames of different priorities have a non-linear relationship and cannot be obtained through simple calculations.

In view of the current difficulties in resource configuration planning in the CAN bus development stage, the present invention provides an optimized design method for the CAN bus. First, an algorithm is provided that can accurately calculate the frame collision rate of the frame of each priority. This algorithm uses the Erlang B formula in the queuing theory and it can accurately calculate the frame collision rate of the frame of each priority in a descending order of priorities. Thus, the resource configuration of the CAN bus can be optimized to minimize the bus resources. The method specifically comprises: calculating the frame collision rate of the frame of each priority under a given bus communication rate and frame sending frequency, then comparing the calculated frame collision rate with the preset upper limit of the allowed frame collision rate of the frame of each priority; if the allowed frame collision rate upper limit is exceeded, then increasing the bus bandwidth (i.e., increasing the communication rate); if the allowed frame collision rate upper limit is not exceeded, then decreasing the communication rate; then continuing to calculate the frame collision rate of the frame of each priority at the new communication rate, and comparing the calculated frame collision rate with the allowed frame collision rate upper limit. This cycle continues until the minimum communication rate is calculated at which the frame collision rate of the frame of each priority does not exceed the corresponding allowed frame collision rate upper limit. The bus bandwidth (communication rate) at this point is the minimum bus bandwidth at which the allowed frame collision rate upper limit is not exceeded under the condition of the fixed sending frequency and frame length, thereby achieving optimization of bus resources.

Figure 3:
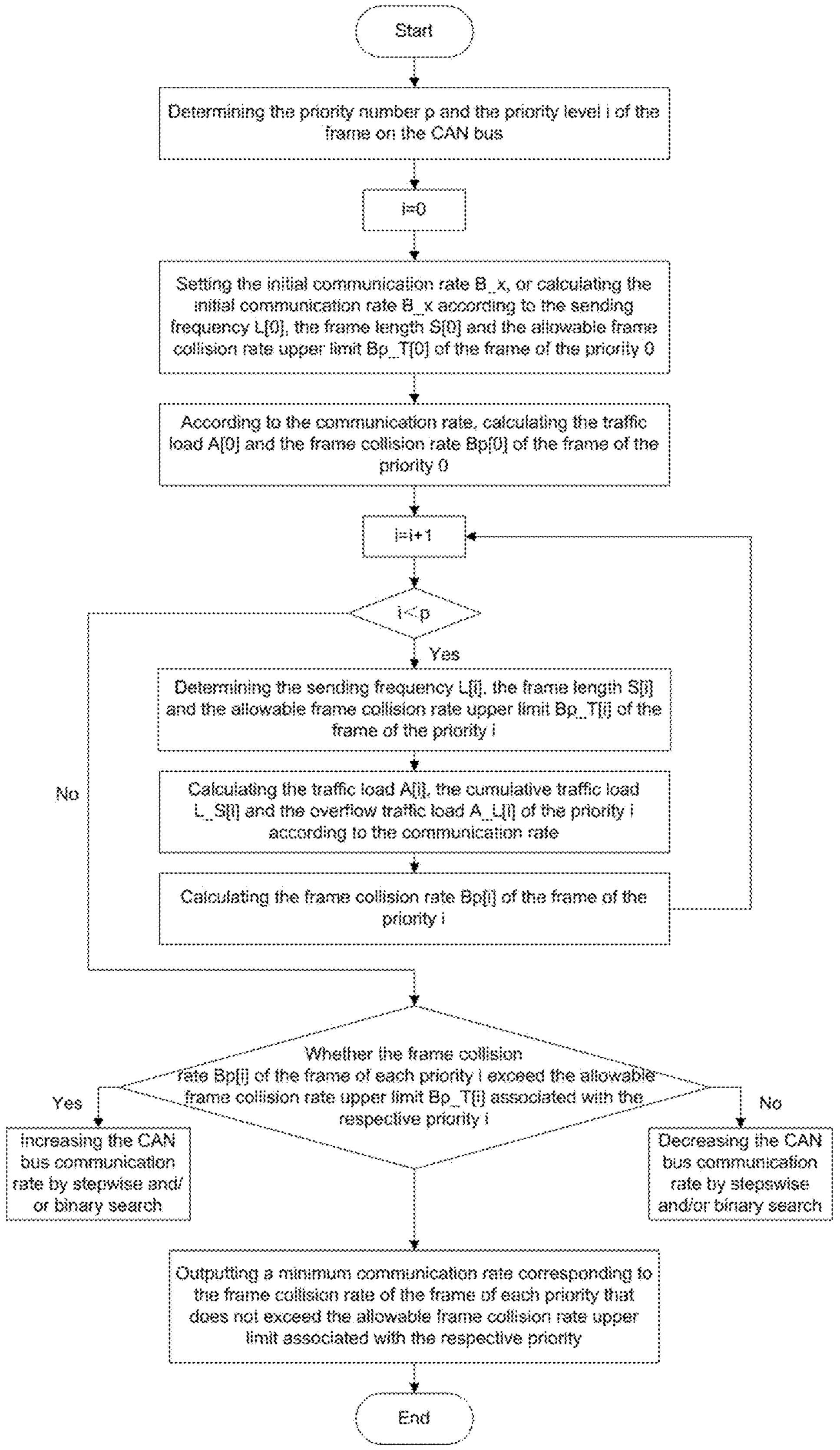
FIG. 3 is a flowchart diagram of a method for calculating the required minimum communication rate of the CAN bus according to an embodiment of the present invention.

As shown in FIG. 1 and FIG. 3, specific steps of a CAN bus resource minimization method according to an embodiment of the present invention are as follows:

S1. setting an initial CAN bus communication rate.

A smaller or larger initial communication rate B_x of the CAN bus is given, the value of which may start from 0, and then the cycle is continued to calculate the minimum communication rate that meets the conditions through determination. However, this method is computationally intensive and the calculation speed is slow. In order to reduce the amount of calculation and improve the calculation efficiency, this embodiment uses the following formula to calculate the initial communication rate of the CAN bus:

$$\mathrm{B\_x} = L[0] \times S[0] \times \frac{1 - \mathrm{Bp\_T}[0]}{\mathrm{Bp\_T}[0]};$$

wherein B_x is the initial CAN bus communication rate, L[0], S[0], and Bp_T[0] respectively represent the sending frequency, the frame length, and the allowable frame collision rate upper limit of the frame of the highest priority.

Figure 2:
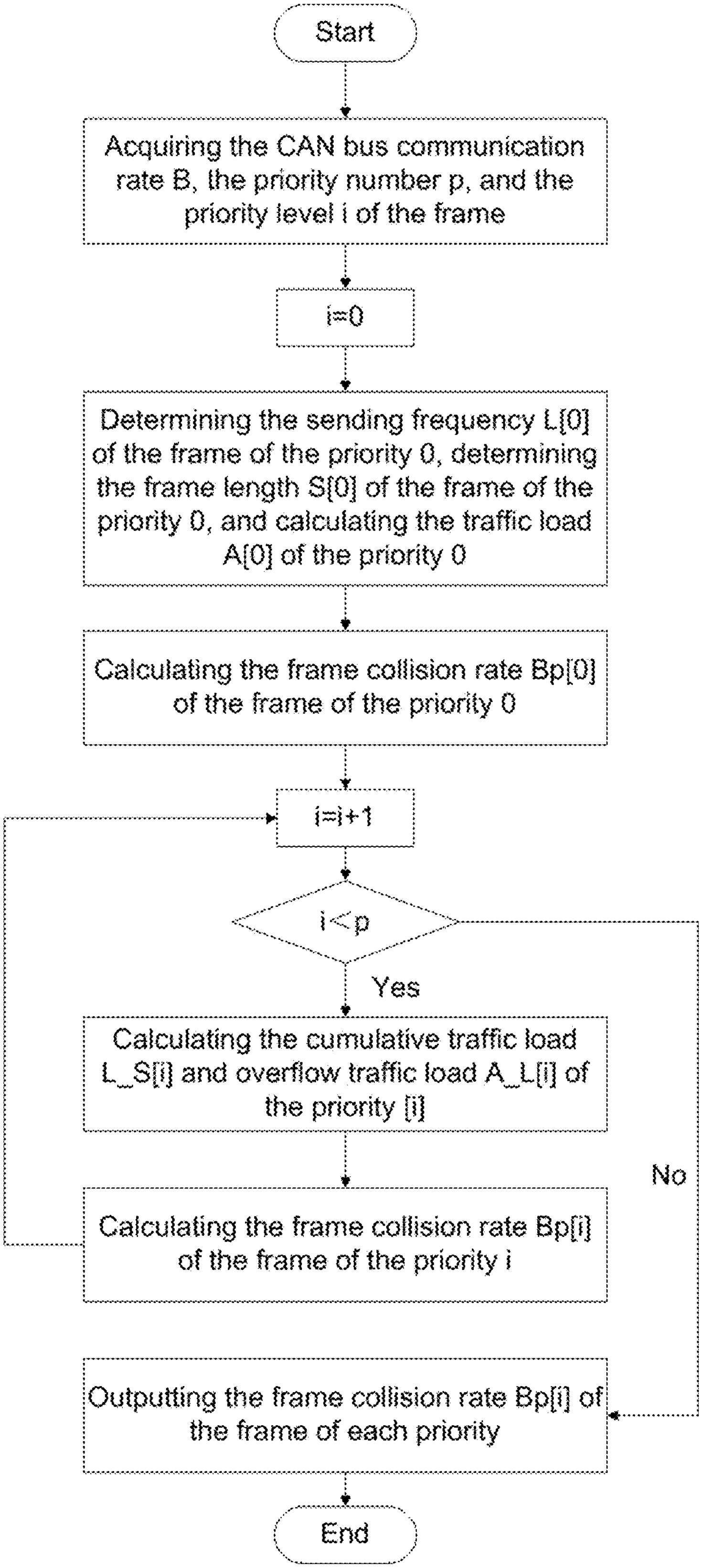
FIG. 2 is a flowchart diagram of a frame collision rate calculation method for a frame of each priority according to an embodiment of the present invention.

S2. in the case where the CAN bus communication rate and the transmission traffic of each priority are fixed, the frame collision rate of the frame of each priority may be calculated. As shown in FIG. 2, the specific process is as follows: at the CAN bus communication rate in step S1 and on the basis of an Erlang B formula in the queuing theory, calculating a frame collision rate of a frame of each priority, the running of which on a CAN bus is planned, wherein the frame collision rate of the frame of the highest priority is calculated directly using the Erlang B formula, while the frame collision rate of the frame of each of the remaining priorities is calculated using the Erlang B formula in combination with the cumulative traffic load and overflow traffic load of the priority.

Usually, three parameters, namely the frame arrival rate λ, the service rate μ (1/μ is the time required for the service) and the number of servers k, need to be known for the Erlang B formula, that is: Bp=Erlang B(A, k). A=λ/μ, and k is the number of servers. In the present application, when the Erlang B formula is applied to the CAN bus to calculate the frame collision rate, the frames of all the priorities run on a CAN bus, so the number of servers k is normalized, i.e., the CAN bus is regarded as one server, k=1. L is the sending frequency of a certain priority, which corresponds to λ in the Erlang B formula. S is the frame length of the frame of a certain priority, B represents the current CAN bus communication rate, then S/B is the time required for the CAN bus to transmit a frame of a certain priority, which corresponds to 1/μ in the Erlang B formula. Therefore, the Erlang B formula may be rewritten as:

$$Bp = Erlang\ B\left(L \times \frac{S}{B},\ 1\right).$$

The frame collision rate Bp[i] of the frame of each priority i is calculated as follows:

$$Bp[i] = \begin{cases} ErlangB(A[i], k) = \dfrac{A[i]}{1 + A[i]}, & i = 0 \\ \dfrac{ErlangB(\mathrm{L\_S}[i], k) \times \mathrm{L\_S}[i] - \mathrm{A\_L}[i])}{A[i]}, & i = 1, 2, \cdots, p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, L_S[i] represents the accumulated traffic load of the priority i, and A_L[i] represents the overflow traffic load from a higher priority to the priority i, wherein the traffic load refers to the ratio of the traffic aggregation of each priority to the transmission rate of the CAN bus.

A[i] is calculated as follows:

$$A[i] = \frac{L[i] \times S[i]}{B};$$

wherein L[i] and S[i] respectively represent the sending frequency and the frame length of the frame of the priority i, and B represents the current CAN bus communication rate.

The cumulative traffic load L_S[i] is calculated as follows:

$$L\_S[i] = \sum_{0}^{i} A[j];\ j = 0, 1, \ldots, i.$$

The overflow traffic load A_L[i] is calculated as follows:

$$A\_L[i] = \sum_{0}^{i-1} (Bp[m] \times A[m]);$$
$$m = 0, 1, \cdots, i-1.$$

S3. determining whether the frame collision rate of the frame of each priority calculated in step S2 exceeds an allowable frame collision rate upper limit associated with the respective priority; if yes, increasing the CAN bus communication rate in step S1, and returning to step S2 for continued iteration; and if not, decreasing the CAN bus communication rate in step S1, and returning to step S2 for continued iteration.

The CAN bus communication rate may be increased/decreased in the stepwise manner, and the fixed step size may be adjusted according to the actual situation. For example, the communication rate (i.e., bus bandwidth) is increased/decreased at a fixed step size of 100 bit/s or 1000 bit/s. A smaller fixed step size will give more accurate results, but it will increase the number of iterations of the calculation and the calculation time. On the contrary, a larger fixed step size will reduce the accuracy of the calculation results, but it increases the calculation speed. The selection of a suitable fixed step size depends on the past accumulated experience of designers.

In some other embodiments, the CAN bus communication rate may also be increased/decreased by using binary search. For example, a larger bus communication rate and a smaller bus communication rate are obtained through two or more cycles; at a smaller communication rate (Data1), the frame collision rate of the frame of all the priorities does not exceed the frame collision rate upper limit of the frame of the priority; and at a larger communication rate (Data2), the frame collision rate of the frame of at least one priority exceeds the frame collision rate upper limit of the frame of the priority. Then the communication rate Data3 of the next cycle may be obtained by binary search between [Data1, Data2]. If the frame collision rate of the frame of all the priorities does not exceed the frame collision rate upper limit of the frame of the priority at the communication rate Data3, then the communication rate Data4 of the next cycle is obtained by binary search between [Data1, Data3]. If the frame collision rate of the frame of at least one priority exceeds the frame collision rate upper limit of the frame of the priority at the communication rate Data3, then the communication rate Data4 of the next cycle is obtained by binary search between [Data3, Data2]. The above cycle is continued until the minimum communication rate at which the frame collision rate upper limit of the frame of each priority is not exceeded is found out. As compared to the stepwise search, the binary search can reduce the amount of calculation and greatly speed up the calculation in some cases.

In some other embodiments, the CAN bus communication rate may also be increased/decreased by combining the stepwise method and binary search method.

S4. outputting a minimum communication rate corresponding to the frame collision rate of the frame of each priority that does not exceed the allowable frame collision rate upper limit associated with the respective priority, so as to complete optimization.

In the prior art, there is no specific algorithm for the frame collision rate, so it is impossible to know the frame collision rate under specific circumstances (including the CAN bus communication rate, the sending frequency of the frame of each priority, the frame length of each priority, and the number of priorities), and thus the bus resources cannot be minimized. In the present invention, an algorithm for calculating the frame collision rate based on the Erlang B formula in the queuing theory is provided, and the bus resources are optimized based on the calculated frame collision rate, so that the minimum bus resources required to ensure that the frame collision rate does not exceed the allowed frame collision rate upper limit when the sending frequency and the frame length are fixed can be found out, thereby realizing optimal configuration of bus resources.

A lower CAN bus communication rate means a lower bus bandwidth and less requirements on devices, and at the same time, the lower CAN bus communication rate reduces the probability of being affected by electromagnetic interference generated by other devices and increases the communication reliability. In the present invention, the required minimum bus resources (communication rate) is accurately calculated based on the sending frequency of the frame of each priority and the preset upper limit of the frame collision rate of the frame of each priority, thereby achieving the purpose of flexible resource configuration and optimized resource utilization.

The present invention is applied in the development stage of products using the CAN communication bus, and relates to a design method of the CAN bus. Particularly, in the case of large bus load and simultaneous transmission of frames of multiple priorities, the design efficiency is improved and the bus resource utilization is optimized, so that users of the CAN bus can realize the optimal configuration of the bus resources in the development stage according to different usage scenarios, and CAN bus resources are saved.

Embodiment 1

In a lithium battery energy storage product, an inverter, an IoT communication module and four battery packs are connected together through the CAN bus. These three kinds of devices send data to the CAN bus periodically or irregularly (triggered by events).

The priority of sending frames is set as follows: if it is an alarm information frame or an event-triggered query information frame, then the frame length is set to 128 bits and the frame is set with a high priority (0X02); and if it is a periodic broadcast data frame, then the frame length is set to 256 bits and the frame is set with a low priority (0X06). The design index for the frame collision rate of the frame of the high priority is ≤3%, while the design index of the frame collision rate of the frame of the low priority is ≤10%.

Table 1 below shows the content type, the sending frequency and the frame length of the data sent by the inverter module to the CAN bus:

TABLE 1

| Content | Sending frequency (frames/s) | Frame length (bit) | Priority |
|---|---|---|---|
| Parts sent periodically | | | |

TABLE 1-continued

| Content | Sending frequency (frames/s) | Frame length (bit) | Priority |
|---|---|---|---|
| Inverter type | 1 | 256 | 0X06 |
| Time information | 1 | 256 | 0X06 |
| Device alarm/fault information | 2 | 256 | 0X06 |
| Photovoltaic power generation information | 2 | 256 | 0X06 |
| Detailed information of power grid | 2 | 256 | 0X06 |
| Load information | 2.5 | 256 | 0X06 |
| Inverter information | 2 | 256 | 0X06 |
| Detailed information of the electric generator | 1 | 256 | 0X06 |
| Parts triggered by events | | | |
| Energy line state | 1 | 128 | 0X02 |
| Device model | 0.4 | 128 | 0X02 |
| PV connection type | 2 | 128 | 0X02 |
| System state | 2 | 128 | 0X02 |
| Working hours statistics | 1 | 128 | 0X02 |
| Historical records | 1 | 128 | 0X02 |
| Sum of annual average power generation capacity | 1 | 128 | 0X02 |
| Sum of power generation capacity in a certain year | 2.5 | 128 | 0X02 |

Table 2 below shows the content type, the sending frequency and the frame length of the data sent by the IoT communication module to the CAN bus:

TABLE 2

| Parts sent periodically | | | |
|---|---|---|---|
| Content | Sending frequency (frames/s) | Frame length (bit) | Priority |
| Periodical data | 2.5 | 256 | 0X06 |

Table 3 below shows the content type, the sending frequency and the frame length of the data sent by the battery pack module to the CAN bus:

TABLE 3

| Content | Sending frequency (frames/s) | Frame length (bit) | Priority |
|---|---|---|---|
| Parts sent periodically | | | |
| Pack basic information | 2 × 4 | 256 | 0X06 |
| Parts triggered by events | | | |
| Pack expansion information | 3 × 4 | 128 | 0X02 |
| Pack fault information | 5 × 4 | 128 | 0X02 |
| About Pack | 1.5 × 4 | 128 | 0X02 |

Based on the data given in the foregoing tables, the implementation method of the embodiment of the present invention is given below.

In this embodiment, there are only two priorities, namely 0X02 and 0X06, wherein 0X02 is a high priority and 0X06 is a low priority, and the traffic aggregation of each priority is calculated as follows:

The high priority: $128\times(1+0.4+2+2+1+1+1+2.5+3\times4+5\times4+1.5\times4)=128\times48.9=6259.2$ bit/s The low priority: $256\times(1+1+2+2+2+2.5+2+1+2.5+2\times4)=256\times24=6144$ bit/s S1. setting an initial CAN bus communication rate, i.e., a smaller/larger initial communication rate B_x of the CAN bus is given, the value of which may start from 0, and then the cycle is continued to calculate the minimum communication rate that meets the conditions through determination. However, this method is computationally intensive and the calculation speed is slow. In order to reduce the amount of calculation and improve the calculation efficiency, this embodiment uses the following formula to calculate the initial communication rate of the CAN bus:

$$B\_x = L[0]\times S[0]\times\frac{1-Bp\_T[0]}{Bp\_T[0]};$$

wherein B_x is the initial CAN bus communication rate, L[0], S[0], and Bp_T[0] respectively represent the sending frequency, the frame length, and the allowable frame collision rate upper limit of the frame of the highest priority.

In this embodiment, there are only two priorities, namely 0X02 and 0X06, wherein 0X02 is a high priority and 0X06 is a low priority. Therefore, this embodiment uses the design index of the frame collision rate of the frame of the high priority 0X02≤3% to calculate the initial communication rate.

$$B\_x = L[0]\times S[0]\times\frac{1-Bp\_T[0]}{Bp\_T[0]} = (1+0.4+2+2+1+1+1+2.5+3\times4+5\times4+1.5\times4)\times 128\times\frac{1-0.03}{0.03} = 6259.2\times\frac{0.97}{0.03} = 202380.8\ \text{bit/s}$$

S2. In the case where the CAN bus communication rate and the transmission traffic of each priority are fixed, the frame collision rate of each priority may be calculated. The frame collision rate Bp[i] of the frame of the priority i is calculated as follows:

$$Bp[i] = \begin{cases} ErlangB(A[i], k) = \dfrac{A[i]}{1+A[i]}, & i=0 \\ \dfrac{ErlangB(L\_S[i], k)\times L\_S[i] - A\_L[i]}{A[i]}, & i=1,2,\ldots,p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, L_S[i] represents the accumulated traffic load of the priority i, and A_L[i] represents the overflow traffic load from a higher priority to the priority i. The traffic load refers to the ratio of the traffic aggregation of each priority to the transmission rate of the CAN bus.

Event-triggered transmission refers to transmission according to instructions of users. The user clicks the query instruction at a certain moment, and the query information frame sent by the user is sent through the CAN bus. The sending frequency is completely determined by the user and it is random. It is possible that there is no query instruction at all in a day (24 hours), or there may be multiple query instructions in a certain period of time (within 10 minutes).

The more the query instructions are, the greater the load traffic will be. By considering randomly triggered information frames as being sent periodically, then the traffic aggregation of the high priority is calculated in the situation with the largest load traffic, and the situation with the largest load traffic may be regarded as the worst (or the most extreme) situation. When calculating the traffic aggregation of the high priority, it is assumed that it is in the worst situation, then the traffic aggregation of the high priority is calculated as follows: 128×(1+0.4+2+2+1+1+1+2.5+3×4+5×4+1.5×4) =128×48.9=6259.2 bit/s The traffic aggregation of the low priority (0X06) is calculated as follows: 256×(1+1+2+2+2+2.5+2+1+2.5+2×4) =256×24=6144 bit/s In the calculation formula of the frame collision rate Bp[i], the calculation formula of the traffic load A[i] of each priority is as follows:

$$A[i] = \frac{L[i] \times S[i]}{B}$$

In this embodiment, first, the initial communication rate of 202380.8 bit/s calculated in the step S1 is adopted as B, then the traffic load of the frame of each priority is calculated as follows:

$$A[0] = 6259.2/202380.8 = 0.0309278$$

$$A[1] = 6144/202380.8 = 0.0303586$$

The frame collision rate of the frame of the high priority is directly calculated using the Erlang B formula as follows:

$$Bp[0] = \frac{A[0]}{1 + A[0]} = \frac{0.0309278}{1 + 0.0309278} = 3\%$$

For the frame collision rate of the frame of other priorities, it is necessary to first calculate the cumulative traffic load and the overflow traffic load, and the calculation formula and specific calculation results thereof are as follows.

The calculation formula of the cumulative traffic load L_S[i] is as follows:

$$\mathrm{L\_S}[i] = \sum\nolimits_0^i A[j];\ j = 0, 1, \ldots , i;$$

Then $$\mathrm{L\_S}\ [1] = \sum\nolimits_0^1 A[j] = A[0] + A[1] = 0.0309278 + 0.0303586 = 0.0612864.$$

The calculation formula of the overflow traffic load A_L [i] is as follows:

$$\mathrm{A\_L}[i] = \sum\nolimits_0^{i-1} (Bp[m] \times A[m]);\ m = 0,1, \ldots , i-1;$$

Then A_L[1] =

-continued $$\sum\nolimits_0^{1-1} (Bp[m] \times A[m]) = Bp[0] \times A[0] = 3\% \times 0.0309278 = 0.09\%.$$

Finally, the frame collision rate of the low priority is calculated as follows:

$$Bp[1] = \frac{ErlangB(\mathrm{L\_S}[1],\ 1) \times \mathrm{L\_S}[1] - \mathrm{A\_L}[1]}{A[1]} = \frac{\frac{\mathrm{L\_S}[1]}{1 + \mathrm{L\_S}[1]} \times \mathrm{L\_S}[1] - \mathrm{A\_L}[1]}{A[1]} = \frac{\frac{0.0612864}{1 + 0.06128640} \times 0.0612864 - 0.09\%}{0.0303586} = 8.7\%$$

S3. determining whether the frame collision rate of the frame of each priority calculated in step S2 exceeds an allowable frame collision rate upper limit associated with the respective priority; if yes, increasing the CAN bus communication rate in step S1, and returning to step S2 for continued iteration; and if not, decreasing the CAN bus communication rate in step S1, and returning to step S2 for continued iteration.

The CAN bus communication rate may be increased/decreased in the stepwise manner, e.g., with a fixed step size of 100 bit/s or 1000 bit/s; or it may be implemented by binary search, or by a combination of stepwise and binary searches.

In this embodiment, Bp[0]=3% and Bp[1]=8.7%, which do not exceed the allowed frame collision rate of 3% and 10%, and thus the CAN bus communication rate of 202380.8 bit/s in the step S1 is again decreased to 200 k bit/s.

According to the communication rate of 200 k bit/s, the calculated frame collision rates of the two priorities are as shown in Table 4 below:

TABLE 4

Frame collision rates of two priorities at the communication rate of 200 k bit/s

| CAN bus communication rate (bit/s) | Priority | Traffic aggregation (bit/s) | Frame collision rate |
|---|---|---|---|
| 200,000 | 0x02 | 6259.2 | 3.03% |
| | 0x06 | 6144 | 8.70% |

According to the design index, the high priority does not meet the design index, and the low priority meets the design index, so the design index is still not met as a whole. Therefore, a value is selected between [200000 bit/s, 202380.8 bit/s] for calculation again. For example, 201190.4 bit/s is selected by binary search for calculation, and after calculation, it is found that the high priority still does not meet the design index.

Finally, through continuous iteration and search, a minimum communication rate of 202380.8 bit/s that meets the design index can be obtained through calculation. At this communication rate, the frame collision rates of the two priorities are as shown in Table 5 below:

TABLE 5

| Frame collision rates of two priorities at the minimum communication rate | | | |
|---|---|---|---|
| CAN bus communication rate (bit/s) | Priority | Traffic load (bit/s) | Frame collision rate |
| 202380.8 | 0x02 | 6259.2 | 3.00% |
| | 0x06 | 6144 | 8.70% |

S4. outputting a minimum communication rate corresponding to the frame collision rate of the frame of each priority that does not exceed the allowable frame collision rate upper limit associated with the respective priority, so as to complete optimization.

Usually, 1000 bit/s is taken as the minimum unit for the communication rate, so the minimum communication rate of 202380.8 bit/s is output as 203 k bit/s.

Embodiment 2

Other conditions of this embodiment are the same as those of Embodiment 1, except that the initial communication rate of the CAN bus is set to 250 k bit/s.

When the CAN bus communication rate and the transmission traffic of each priority are fixed, the frame collision rate of a specific priority is calculated. The frame collision rate of the frame of the highest priority is directly calculated using the Erlang B formula, and the frame collision rate of the frame of other priorities is calculated using the Erlang B formula in combination with the cumulative traffic load and the overflow traffic load of the priority. The frame collision rates of the two priorities are calculated respectively as shown in Table 6 below:

TABLE 6

| Frame collision rates of two priorities at the communication rate of 250 k bit/s | | | |
|---|---|---|---|
| CAN bus communication rate (bit/s) | Priority | Traffic aggregation (bit/s) | Frame collision rate |
| 250,000 | 0x02 | 6259.2 | 2.45% |
| | 0x06 | 6144 | 7.06% |

According to the design index, the frame collision rate of the frame of the high priority 0 (0x02) needs to be controlled below 3%, and the frame collision rate of the frame of the low priority 1 (0x06) needs to be controlled below 10%. The above results meet the design index, but the value is too high to meet the minimum communication rate requirements of the output CAN bus. Thus, the value of the CAN bus communication rate is re-selected to be 150 k bit/s.

When the value of the CAN bus communication rate is 150 k bit/s, the frame collision rates of the two priorities are as shown in Table 7 below:

TABLE 7

| Frame collision rates of two priorities at the communication rate of 150 k bit/s | | | |
|---|---|---|---|
| CAN bus communication rate (bit/s) | Priority | Traffic aggregation (bit/s) | Frame collision rate |
| 150,000 | 0x02 | 6259.2 | 4.01% |
| | 0x06 | 6144 | 11.35% |

According to the design index, it is obvious that the above results do not meet the design index, so the CAN bus communication rate is adjusted again. 200 k bit/s between [150 k bit/s, 250 k bit/s] may be selected by binary search for calculation again. The frame collision rates of the two priorities are the same as those in Table 4.

According to the design index, the frame collision rate of the frame of the high priority is 3.03%, which does not meet the design index; while the frame collision rate of the frame of the low priority is 8.70%, which meets the design index. The design index is still not met as a whole, so binary search may still be continuously performed so as to find out the minimum communication rate that meets the design index.

Finally, the minimum CAN bus resources that meet the design index can be obtained after the calculation, as shown in Table 5 above. At this time, the required CAN bus communication rate is 202380.8 bit/s. The purpose of minimizing CAN bus resources is achieved.

In the present invention, by adopting the Erlang B formula in the queuing theory, and based on data of the fixed sending frequency, the frame length and the given communication rate, the frame collision rate of the frame of each priority is accurately calculated in the descending order of priorities, then the calculated frame collision rate is compared with the preset allowed upper limit of the frame collision rate to determine whether it exceeds the allowed upper limit of the frame collision rate. If it exceeds the allowed upper limit of the frame collision rate, then the communication rate (i.e., the bus bandwidth) is further increased; and if it does not exceed the allowed upper limit of the frame collision rate, then the communication rate is decreased; and then the frame collision rate is recalculated until the minimum communication rate corresponding to not exceeding the frame collision rate upper limit allowed by the frame of each priority is acquired, so that the minimum CAN bus communication rate is calculated and resource configuration optimization of the CAN bus is realized. As can be seen from the Embodiment 2, by using the calculation formula provided in the present invention to calculate the initial communication rate, the calculation amount can be greatly reduced and the calculation efficiency can be improved.

As shall be appreciated by those skilled in the art, the embodiments of the present invention may be provided as methods, systems, or computer program products. For example, the present invention may also provide a readable storage medium on which a computer program is stored, and the computer program, when executed by a processor, can implement the steps of the CAN bus resource minimization method in the aforementioned embodiments. Thus, the present invention may take the form of an entirely hardware embodiment, an entirely software embodiment, or an embodiment combining software and hardware. Furthermore, the present invention may take the form of a computer program product embodied on one or more computer-usable storage media (including, but not limited to, a disk storage, a CD-ROM, an optical storage, etc.) having computer-usable program codes included therein.

The present invention is described with reference to flowchart diagrams and/or block diagrams of the methods, devices (systems), and computer program products according to the embodiments of the present invention. It shall be appreciated that, each process and/or block in the flowchart diagrams and/or block diagrams, and combinations of processes and/or blocks in the flowchart diagrams and/or block diagrams may be implemented by computer program instructions. These computer program instructions may be provided to a processor of a general purpose computer, a special purpose computer, an embedded processor, or other programmable data processing devices to produce a machine, such that the instructions executed by the processor of the computer or other programmable data processing devices produce a device for realizing the functions specified in one or more processes of the flowchart diagrams and/or one or more blocks of the block diagrams.

These computer program instructions may also be stored in a computer-readable storage which can guide a computer or other programmable data processing devices to operate in a particular manner, such that the instructions stored in the computer-readable storage produce an article of manufacture including the instruction means, and the instructions means implements the functions specified in one or more processes of the flowchart diagrams and/or one or more blocks of the block diagrams.

These computer program instructions may also be loaded onto a computer or other programmable data processing devices, so that a series of operating steps are performed on the computer or other programmable devices to produce computer-implemented processing, and thus instructions executed on the computer or other programmable devices provide steps for implementing the functions specified in one or more processes of the flowchart diagrams and/or one or more blocks of the block diagrams.

What described above is further detailed description of the present invention with reference to specific/preferred embodiments, and it should not be concluded that the specific embodiments of the present invention are only limited to these descriptions. For those of ordinary skill in the art to which the present invention belongs, several substitutions or modifications to the described embodiments can be made without departing from the concept of the present invention, and all these substitutions or modifications should be regarded as falling within the scope claimed in the present invention. In the description of this specification, descriptions made with reference to terms of "one embodiment," "some embodiments," "preferred embodiments," "examples," "specific examples," or "some examples" mean that specific features, structures, materials or characteristics described in combination with the embodiment or the example are included in at least one embodiment or example of the present invention. In this specification, the schematic expressions of the above terms are not necessarily directed to the same embodiment or example. Furthermore, the specific features, structures, materials or characteristics described may be combined in a suitable manner in any one or more embodiments or examples. Different embodiments or examples and the features of different embodiments or examples described in this specification may be incorporated and combined by those skilled in the art without conflicting with each other. Although the embodiments and the advantages of the present invention have been described in detail, it shall be appreciated that, various changes, substitutions and alterations can be made herein without departing from the scope claimed in the patent application.

The invention claimed is:

1. A CAN bus resource minimization method, comprising:

S1. setting an initial CAN bus communication rate;

S2. at the CAN bus communication rate in step S1 and on the basis of an Erlang B formula in the queuing theory, calculating a frame collision rate of a frame of each priority, the running of which on a CAN bus is planned;

S3. determining whether the frame collision rate of the frame of each priority calculated in step S2 exceeds an allowable frame collision rate upper limit associated with the respective priority;

when the frame collision rate calculated in step S2 exceeds the allowable frame collision rate upper limit, increasing the CAN bus communication rate in step S1, and returning to step S2 to recalculate the frame collision rate of the frame of each priority;

when the frame collision rate calculated in step S2 does not exceed the allowable frame collision rate upper limit, decreasing the CAN bus communication rate in step S1, and returning to step S2 to recalculate the frame collision rate of the frame of each priority; and

S4. outputting a minimum CAN bus communication rate corresponding to the frame collision rate of the frame of each priority that does not exceed the allowable frame collision rate upper limit associated with the respective priority.

2. The CAN bus resource minimization method according to claim 1, wherein a fixed value is given as the initial CAN bus communication rate, in the step S1.

3. The CAN bus resource minimization method according to claim 1, wherein in the step S1, the initial CAN bus communication rate is calculated by the following formula:

$$B_x = L[0] \times S[0] \times \frac{1 - Bp_{T[0]}}{Bp_{T[0]}};$$

wherein $B_x$ is the initial CAN bus communication rate, L[0], S[0], and $Bp_{T[0]}$ respectively represent the sending frequency, the frame length, and the allowable frame collision rate upper limit of the frame of the highest priority.

4. The CAN bus resource minimization method according to claim 1, wherein the step S2 comprises: at the CAN bus communication rate in step S1 and on the basis of an Erlang B formula in the queuing theory, calculating the frame collision rate of the frame of each priority in the descending order of priorities, wherein the frame collision rate of the frame of the highest priority is calculated directly using the Erlang B formula, while the frame collision rate of the frame of each of the remaining priorities is calculated using the Erlang B formula in combination with a cumulative traffic load and an overflow traffic load associated with the respective priority.

5. The CAN bus resource minimization method according to claim 4, wherein the frame collision rate Bp[i] of the frame of priority i is calculated as follows:

$$Bp[i] = \begin{cases} ErlangB(A[i], k) = \dfrac{A[i]}{1 + A[i]}, & i = 0 \\ \dfrac{ErlangB(L_{S[i]}, k) \times L_{S[i]} - A_{L[i]}}{A[i]}, & i = 1, 2, \ldots, p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, $L_{S[i]}$ represents the accumulated traffic load of the priority i, and $A_{L[i]}$ represents the overflow traffic load from a higher priority to the priority i.

6. The CAN bus resource minimization method according to claim 5, wherein the traffic load A[i] of the priority i relative to the CAN bus, the accumulated traffic load $L_{S[i]}$ of the priority i, and the overflow traffic load $A_{L[i]}$ from a higher priority to the priority i are calculated respectively as follows:

$$A[i] = \frac{L[i] \times S[i]}{B};$$

$$L\_S[i] = \sum_0^i A[j];\ j = 0,1,\ \dots\ ,\ i;$$

$$A\_L[i] = \sum_0^{i-1} (Bp[m] \times A[m]);\ m = 0,1,\ \dots\ ,\ i-1;$$

wherein L[i] and S[i] respectively represent the sending frequency and the frame length of the frame of the priority i, and B represents the current CAN bus communication rate.

7. The CAN bus resource minimization method according to claim 1, wherein the increasing or decreasing of the CAN bus communication rate in the step S3 is performed by a stepwise method and/or a binary search method.

8. A non-transitory computer-readable storage medium with a computer program stored thereon, wherein the computer program, when executed by a processor, can implement a CAN bus resource minimization method, wherein the CAN bus resource minimization method comprises:

S1. setting an initial CAN bus communication rate;

S2. at the CAN bus communication rate in step S1 and on the basis of an Erlang B formula in the queuing theory, calculating a frame collision rate of a frame of each priority, the running of which on a CAN bus is planned;

S3. determining whether the frame collision rate of the frame of each priority calculated in step S2 exceeds an allowable frame collision rate upper limit associated with the respective priority;

when the frame collision rate calculated in step S2 exceeds the allowable frame collision rate upper limit, increasing the CAN bus communication rate in step S1, and returning to step S2 to recalculate the frame collision rate of the frame of each priority;

when the frame collision rate calculated in step S2 does not exceed the allowable frame collision rate upper limit, decreasing the CAN bus communication rate in step S1, and returning to step S2 to recalculate the frame collision rate of the frame of each priority; and S4. outputting a minimum CAN bus communication rate corresponding to the frame collision rate of the frame of each priority that does not exceed the allowable frame collision rate upper limit associated with the respective priority.

9. The non-transitory computer-readable storage medium according to claim 8, wherein a fixed value is given as the initial CAN bus communication rate, in the step S1.

10. The non-transitory computer-readable storage medium according to claim 8, wherein in the step S1, the initial CAN bus communication rate is calculated by the following formula:

$$B_x = L[0] \times S[0] \times \frac{1 - Bp_{T[0]}}{Bp_{T[0]}};$$

wherein $B_x$ is the initial CAN bus communication rate, L[0], S[0], and $Bp_{T[0]}$ respectively represent the sending frequency, the frame length, and the allowable frame collision rate upper limit of the frame of the highest priority.

11. The non-transitory computer-readable storage medium according to claim 8, wherein the step S2 comprises: at the CAN bus communication rate in step S1 and on the basis of an Erlang B formula in the queuing theory, calculating the frame collision rate of the frame of each priority in the descending order of priorities, wherein the frame collision rate of the frame of the highest priority is calculated directly using the Erlang B formula, while the frame collision rate of the frame of each of the remaining priorities is calculated using the Erlang B formula in combination with a cumulative traffic load and an overflow traffic load associated with the respective priority.

12. The non-transitory computer-readable storage medium according to claim 11, wherein the frame collision rate Bp[i] of the frame of priority i is calculated as follows:

$$Bp[i] = \begin{cases} ErlangB(A[i], k) = \dfrac{A[i]}{1 + A[i]},\ i = 0 \\ \dfrac{ErlangB(L_{S[i]}, k) \times L_{S[i]} - A_{L[i]}}{A[i]},\ i = 1,2,\ \dots\ ,\ p-1 \end{cases}$$

wherein, i=0 represents the highest priority, i=1, 2, . . . , p−1 represents the remaining priorities in the descending order, the number of priorities planned to run on the CAN bus is p; A[i] represents the traffic load of the priority i relative to the CAN bus, k=1, $L_{S[i]}$ represents the accumulated traffic load of the priority i, and $A_{L\ [i]}$ represents the overflow traffic load from a higher priority to the priority i.

13. The non-transitory computer-readable storage medium according to claim 12, wherein the traffic load A[i] of the priority i relative to the CAN bus, the accumulated traffic load $L_{S[i]}$ of the priority i, and the overflow traffic load $A_{L[i]}$ from a higher priority to the priority i are calculated respectively as follows:

$$A[i] = \frac{L[i] \times S[i]}{B};$$

$$L\_S[i] = \sum_0^i A[j];\ j = 0,1,\ \dots\ ,\ i;$$

$$A_{L[i]} = \sum_0^{i-1} (Bp[m] \times A[m]);\ m = 0,1,\ \dots\ ,\ i-1;$$

wherein L[i] and S[i] respectively represent the sending frequency and the frame length of the frame of the priority i, and B represents the current CAN bus communication rate.

14. The non-transitory computer-readable storage medium according to claim 8, wherein the increasing or decreasing of the CAN bus communication rate in the step S3 is performed by a stepwise method and/or a binary search method.

* * * * *